(12) United States Patent
Garcia

(10) Patent No.: US 9,302,786 B2
(45) Date of Patent: Apr. 5, 2016

(54) DEVICE FOR CLEANING AERONAUTICAL PARTS

(71) Applicant: Honore Garcia, Urrugne (FR)

(72) Inventor: Honore Garcia, Urrugne (FR)

( * ) Notice: Subject to any disclaimer, the term of this patent is extended or adjusted under 35 U.S.C. 154(b) by 0 days.

(21) Appl. No.: 13/862,531

(22) Filed: Apr. 15, 2013

(65) Prior Publication Data

US 2013/0276256 A1  Oct. 24, 2013

(30) Foreign Application Priority Data

Apr. 20, 2012  (FR) .................................. 12 53637

(51) Int. Cl.
*B64F 5/00* (2006.01)
*B08B 3/00* (2006.01)
*B08B 3/02* (2006.01)

(52) U.S. Cl.
CPC ............... *B64F 5/0018* (2013.01); *B08B 3/006* (2013.01); *B08B 3/026* (2013.01); *B08B 2203/0229* (2013.01)

(58) Field of Classification Search
CPC . A47L 11/34; A47L 11/4044; A47L 11/4088; A47L 9/08; A47L 9/02; A47L 9/06; A47L 9/242

USPC .......... 15/32, 321, 344, 353, 345, 348, 415.1, 15/416, 322; 134/21, 36, 172
See application file for complete search history.

(56) References Cited

U.S. PATENT DOCUMENTS

| | | | |
|---|---|---|---|
| 5,125,126 A * | 6/1992 | Bonnant | 15/321 |
| 5,443,653 A | 8/1995 | Riley | |
| 6,938,838 B2 * | 9/2005 | Kawamoto | 239/504 |
| 6,997,395 B2 | 2/2006 | Kawamoto | |
| 7,028,925 B2 * | 4/2006 | Guest et al. | 239/526 |
| 7,406,739 B2 * | 8/2008 | Guest et al. | 15/49.1 |
| 2007/0107159 A1 * | 5/2007 | Kawamoto | 15/322 |

FOREIGN PATENT DOCUMENTS

| | | |
|---|---|---|
| EP | 1 352 692 | 10/2003 |
| FR | 2 756 503 | 6/1998 |

OTHER PUBLICATIONS

French Search Report dated Jan. 14, 2013, corresponding to the Foreign Priority Application No. 12 53637.

* cited by examiner

*Primary Examiner* — Dung Van Nguyen
(74) *Attorney, Agent, or Firm* — Young & Thompson

(57) ABSTRACT

Device for cleaning aeronautical parts after machining or piercing includes an element for spraying a liquid on the part to be cleaned and an element for aspirating the oil-soiled liquid, chips and/or dust.

3 Claims, 3 Drawing Sheets

DEVICE FOR CLEANING AERONAUTICAL PARTS

FIELD OF THE INVENTION

The present invention relates to a device allowing the cleaning of aeronautical parts after machining or piercing (whether the parts are metallic or made of composite materials).

BACKGROUND OF THE INVENTION

After the machining or the piercing of the aircraft parts, the cutting liquid mixed with the chips remains "stuck" to the walls. A systematic cleaning of the aircraft parts is necessary. The operators use a solvent commonly called "Diestone" which is applied either by paintbrush or in pads.

In the case of application by brush, the product is spread over the parts and the consumption of solvent is extremely high. In addition to the consumption aspect, the vapors are troublesome and even harmful for the user. Although giving better results than the pads, this method of application has been forbidden because of too high a consumption of solvent.

In the case of application with pads, the consumption of pads is exorbitant, but remains the only method authorized. The vapors are troublesome and even harmful for the user.

SUMMARY OF THE INVENTION

The object of the invention is therefore, notably, to propose a device that makes it possible to reduce the consumption of consumables (solvent or pads), makes the cleaning task for colleagues easier, reduces the cleaning time and recovers most of the soiled solvent.

According to the invention, the device for cleaning aeronautical parts after machining or piercing is wherein it comprises a means for spraying a liquid on the part to be cleaned and a means for aspirating the oil-soiled liquid, chips and/or dust.

Advantageously, the liquid used is a solvent. This makes it possible to degrease the parts more easily.

The device may comprise a means for filtering the soiled liquid allowing the filtration of the soiled liquid before it is stored.

The device may also comprise a closed circuit allowing the soiled liquid, once retreated by filtration, to be reused by the spraying means.

The spraying means may comprise a gun fitted with a trigger, the actuation of the trigger allowing the spraying of the liquid.

The gun may comprise a plurality of bristles forming a brush, the jet of liquid originating from the gun being directed toward the bristles.

The aspiration means may comprise a duct provided on the gun fitted with the brush.

The aspiration means may comprise a venturi-effect vacuum system supplied by compressed air.

BRIEF DESCRIPTION OF THE DRAWINGS

Other features and advantages of the invention will become evident in the following description of a preferred embodiment with reference to the appended drawings, but which is in no way limiting in nature.

In these drawings.

DETAILED DESCRIPTION OF THE INVENTION

The invention takes the form of a system which makes it possible to bring solvent to the soiled parts and then to aspirate the mixture.

Like the application with a paintbrush, the invention carries solvent to a specific brush. Any solvent can be used by the system, but the most widely used are those of the DIESTONE range (DLS, A8287, A8284, A8290, D, DLS/UV, E, G11, HFP, M-SK, M-TK, S), products of the SOCOMORE brand. The aeronautical industry has, for the time being, approved only one solvent used by all those involved in this type of operation.

The system allows the colleagues to "brush" the parts to be cleaned with a controlled provision of solvent, but unlike application with a paintbrush, the system retrieves the soiled product (solvent+chips+cutting oil), treats it (filtration) and carries it back again to the brush. The solvent is therefore recycled which makes it possible to save a large quantity of solvent. The cleaned parts may be metallic or made of composite materials.

Since the solvent that is used has a very low flash point (30° C.), the system must not give off any source of excessive heat or generate sparks. The device according to the invention is therefore designed so as to comply with an ATEX (explosive atmospheres) standard.

Other solvents exist but their use is not homologated for such a use in the field of aeronautics. Moreover, although the flash point may sometimes be higher and reach approximately 110° C., the ATEX standard is still necessary. If new solvents having higher flash points reaching 300° C. or more were found to be useable, their use would however necessitate the device used being brought to the ATEX standards. The device according to the invention will therefore remain totally pertinent.

Here are the safety measures that the system complies with:

Construction safety "c": mechanical devices with movement and friction recognized to be safe for preventing heating and sparks.

To do this, the retrieval of the soiled product by aspiration is carried out by virtue of an aspirator supplied by compressed air. The compressed air and a venturi phenomenon makes it possible to carry out an aspiration with no electric power supply. Specifically, the system has no electrical element so as to eliminate the risks of explosive which could be caused by the latter. Thus the aspiration is carried out by a venturi-effect vacuum system supplied by compressed air.

The decanting pump 6 is also pneumatic. No electric circuit is present and no solenoid valve is used.

Figure 1:
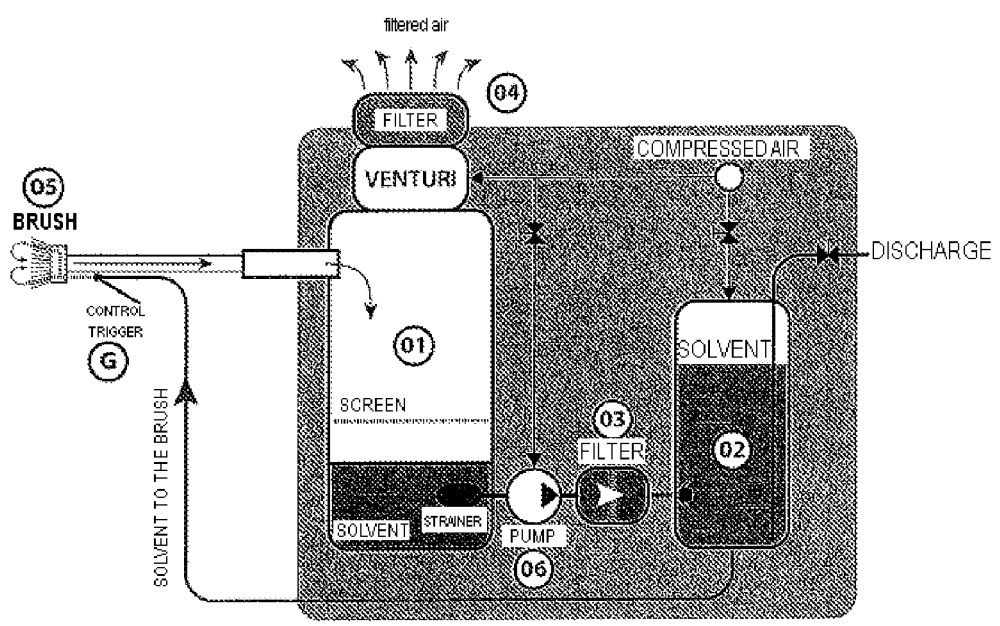
FIG. 1 is a diagram of a first embodiment of a device according to the invention.

The system has two versions:

A single-station device (FIG. 1): this device is mobile and consists of an independent aspiration device. It consists of all the functional elements in order to make the device autonomous. With respect to the power supply, this device can be connected to any source of compressed air.

Figure 2:
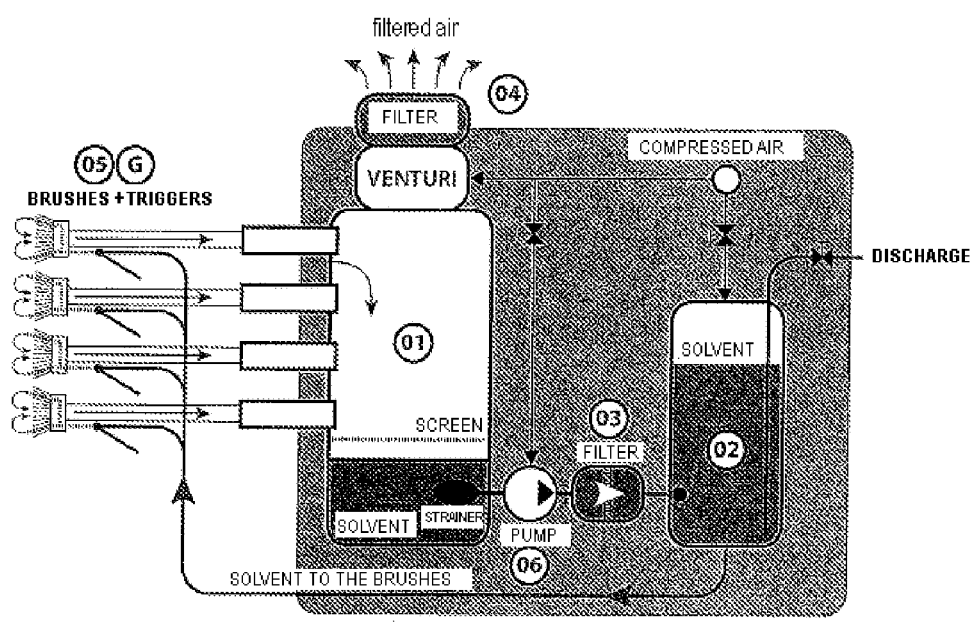
FIG. 2 is a diagram of a second embodiment of a device according to the invention.
Figure 3:
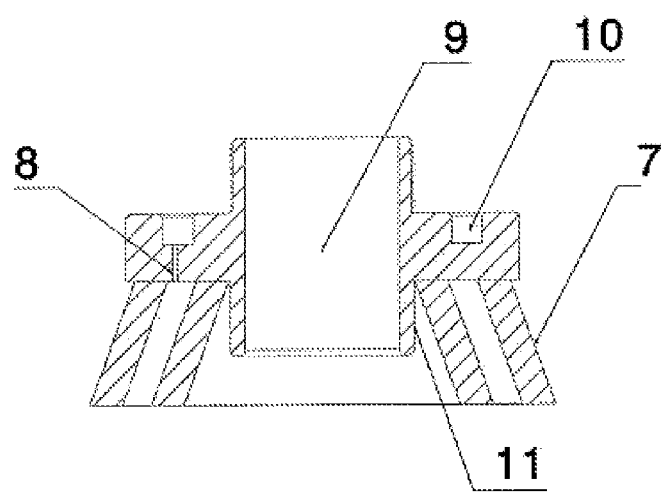
FIG. 3 is a view in cross section of a brush used in a device according to the invention.

A multi-station device (FIG. 2): this device is fixed and consists of a general aspiration system. The colleagues can connect several aspiration couplings to the system.

In addition to saving solvent by recovering it, the aspiration also makes it possible to substantially reduce the vapors of the cleaning solvent. Specifically, a filter system is used in order to reduce the discharge of particles. Two configurations are possible:

For a single-station device, the contaminated air is filtered on leaving the aspirator (specific filter mounted on the aspirator). Specifically, the solvent vapors are troublesome and even harmful for the user. This is why the system filters out these particles in order to give off as little as possible thereof and thus improve the working conditions for the colleagues.

For a multi-station device, the contaminated air is carried out of the building and/or to a specific, high-capacity filtration element. The principle remains the same except that the filtration system is centralized and sufficiently dimensioned in order to be able to filter all of the particles.

The cleaning system operates in the following manner:

First of all, the compressed-air supply is connected to the system for two reasons:

To supply the venturi system in order to create aspiration in the main tank 1 of the system.

To increase the pressure in the solvent reservoir 2 in order to be able to send it under pressure to the brush 5.

The user then uses the device by releasing the solvent onto the parts to be cleaned. For this, he actuates the trigger G in order to release the solvent. While cleaning, the system aspirates the soiled solvent through the brush 5. Chips and oils are then possibly present. The mixture is in the main tank 1 of the system and it is filtered by virtue of a screen. The particles due to the solvent vapors during aspiration are for their part filtered by virtue of a filter 4. The solvent is then at the bottom of the main tank 1. Once all the solvent present originally in the solvent reservoir 2 is in the main tank 1, a decanting process is begun. A pneumatic pump 6 is started, which has the effect of decanting the solvent from the main tank 1 to the reservoir 2. During the decanting, a filter 3 is responsible for separating the last impurities from the solvent. Thus the solvent with no impurities is again stored in the solvent reservoir 2.

The recycling process is optional. If the user wishes to closely control the characteristics of the solvent when it is sprayed, the soiled solvent is simply stored before discharge. Its aspiration will all the same have made it possible to improve the characteristics of the working atmosphere.

If no recycling is carried out, the pneumatic pump 6 and the filter 3 are removed.

The brushing device takes the form of a gun fitted with a brush 5 of which the form may be varied according to the complexity of the zones to be treated. The brush 5 may be made to resemble an oval, a round, a square, a rectangle etc. The brush 5 comprises several rows of bristles 7 which are used to sweep the chips and to make the cleaning of the surfaces to be treated easier. The bristles 7 are inclined which makes it possible to prevent them being aspirated and makes it possible to divert the flow of solvent which soaks the bristles.

Moreover, a cylindrical yoke 11 prevents the bristles 7 from being aspirated and obstructing the aspiration duct. The solvent is delivered by virtue of one or more orifices 8 between the two rows of bristles 7. Of variable shape, the dimensions of the holes may be changed as a function of the desired flow rate. The solvent travels in a groove 10 before flowing through the hole 8.

While cleaning, the brush aspirates the soiled mixture of product through a central duct 9.

Since the product used is corrosive, the seals that are usually used in this technical field are rapidly damaged. It has therefore been necessary to use special seals made of perfluorinated elastomer (FFKM: standards ISO 1629 and ASTM 1418) in particular at the trigger.

Finally, it has been found that a continuous aspiration during the cleaning could generate an increase in the consumption of solvent.

A control for stopping the aspiration has therefore been put in place in the vicinity of the trigger. A small orifice has been arranged allowing a slight stream of air to escape at all times. When the operator blocks this orifice with his thumb, an overpressure is produced which is transmitted via a duct to a pneumatic valve the control of which makes it possible to stop the air supply of the venturi device, thus stopping the aspiration. When the operator lifts his thumb, the aspiration continues.

This purely pneumatic device conforms to the ATEX standards and moreover is extremely rustic and very reliable.

The invention claimed is:

1. A pneumatic device for cleaning aeronautical parts after machining or piercing, said device comprising a pneumatic means for spraying a solvent on the part to be cleaned and a pneumatic means for aspirating the oil-soiled liquid, chips and/or dust, the control of the device being pneumatic, wherein the pneumatic means for spraying a solvent on the part to be cleaned and the pneumatic means for aspirating the oil-soiled liquid, chips and/or dust are comprised of:
   i) a compressed-air inlet that accepts a supply of compressed air,
   ii) a main tank (1) with a venturi system connected to the compressed-air inlet to receive the compressed air to create aspiration in the main tank, wherein the main tank holds a first portion of the solvent,
   iii) a trigger-controlled brush (5) having a discharge connected to the main tank, wherein soiled solvent is aspirated through the brush into the main tank to add to the first portion of the solvent, aspiration of the soiled solvent brings chips and oils into the main tank,
   iv) a screen located within the main tank above the first portion of the solvent, the screen filtering particles due to the chips and oils from the soiled solvent,
   v) a pneumatic pump (2) connected to a solvent outlet of the main tank, and
   vi) a solvent reservoir (2) connected to the compressed-air inlet to receive the compressed air to pressurize a second portion of the solvent contained in the solvent reservoir, the solvent reservoir having a solvent inlet in fluid communication with a discharge of the pump, and a solvent outlet in fluid communication with the control trigger of the brush, operation of the control trigger releasing pressurized solvent from the brush, operation of the pump decanting the first portion of the solvent from the main tank to the solvent reservoir, and
   wherein the cleaning device has no electrical element.

2. The cleaning device as claimed in claim 1, wherein the solvent is Diestone and has a flash point below or equal to 110° C.

3. A pneumatic device for cleaning aeronautical parts after machining or piercing, said device comprising a pneumatic means for spraying a solvent on the part to be cleaned and a pneumatic means for aspirating the oil-soiled liquid, chips and/or dust, the control of the device being pneumatic, wherein the pneumatic means for spraying a solvent on the part to be cleaned and the pneumatic means for aspirating the oil-soiled liquid, chips and/or dust are comprised of:
   i) a compressed-air inlet that accepts a supply of compressed air, ii) a main tank (1) with a venturi system connected to the compressed-air inlet to receive the compressed air to create aspiration in the main tank, wherein the main tank holds a first portion of the solvent, iii) a trigger-controlled brush (5) having a discharge connected to the main tank, wherein soiled solvent is aspirated through the brush into the main tank to add to the first portion of the solvent, aspiration of the soiled solvent brings chips and oils into the main tank, iv) and a solvent reservoir (2) connected to the compressed-air inlet to receive the compressed air to pressurize a second portion of the solvent contained in the solvent reservoir, and a solvent outlet in fluid communication with the control trigger of the brush, operation of the control trigger releasing pressurized solvent from the brush, the cleaning device has no electrical element, and the solvent is Diestone and has a flash point below or equal to 110° C.

\* \* \* \* \*